US012691621B2

(12) United States Patent (10) Patent No.: US 12,691,621 B2
Hotta et al. (45) Date of Patent: Jul. 28, 2026

(54) CONTROL DEVICE OF INJECTION MOLDING MACHINE, INJECTION MOLDING MACHINE, AND METHOD OF CONTROLLING INJECTION MOLDING MACHINE

(71) Applicant: SUMITOMO HEAVY INDUSTRIES, LTD., Tokyo (JP)

(72) Inventors: Daigo Hotta, Chiba (JP); Koki Yamashita, Chiba (JP); Hajime Ono, Chiba (JP); Takuya Matsunaga, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 239 days.

(21) Appl. No.: 18/448,741

(22) Filed: Aug. 11, 2023

(65) Prior Publication Data

US 2024/0092005 A1 Mar. 21, 2024

(30) Foreign Application Priority Data

Sep. 16, 2022 (JP) ................................. 2022-148559

(51) Int. Cl.
    *B29C 45/76* (2006.01)
    *B29C 45/77* (2006.01)
(52) U.S. Cl.
    CPC .... *B29C 45/77* (2013.01); *B29C 2945/76006* (2013.01); *B29C 2945/76498* (2013.01)
(58) Field of Classification Search
    CPC .................... B29C 45/76; B29C 45/77; B29C 2945/76498
    See application file for complete search history.

(56) References Cited

U.S. PATENT DOCUMENTS

| 6,811,387 B1 | 11/2004 | Tsutsumi et al. |
| 9,555,571 B1 | 1/2017 | Chang et al. |
| 2006/0017416 A1 | 1/2006 | Konno |

FOREIGN PATENT DOCUMENTS

| CN | 103358497 A | 10/2013 |
| CN | 106313420 A | 1/2017 |
| EP | 3112123 A1 | 1/2017 |
| EP | 3 546 179 B1 | 1/2021 |

(Continued)

OTHER PUBLICATIONS

Office Action of the corresponding DE 10 2023 124 592.9 mailed on Oct. 18, 2024.

(Continued)

*Primary Examiner* — James Sanders
(74) *Attorney, Agent, or Firm* — WTA IP Law P.C.

(57) ABSTRACT

A control device of an injection molding machine including an injection member that presses a molding material and an injection drive source that moves the injection member, includes: an injection control unit that controls, in a holding pressure process of controlling a pressure acting on the molding material from the injection member, the injection drive source based on a set value of the pressure and on an actual value of the pressure, in which the injection control unit uses a value subtracted over time from the set value of the pressure so that the actual value of the pressure gradually decreases with respect to the set value of the pressure, or uses a value added over time to the actual value of the pressure so that the actual value of the pressure gradually decreases with respect to the set value of the pressure.

8 Claims, 11 Drawing Sheets

(56) References Cited

FOREIGN PATENT DOCUMENTS

| | | | |
|---|---|---|---|
| JP | S60-72713 | A | 4/1985 |
| JP | S63-128926 | A | 6/1988 |
| JP | H1-288419 | A | 11/1989 |
| JP | 2001-252957 | A | 9/2001 |
| JP | 2004-114427 | A | 4/2004 |
| JP | 4266224 | B2 | 2/2009 |
| JP | 2011-183706 | A | 9/2011 |
| JP | 2012-161982 | A | 8/2012 |
| JP | 2013-103401 | A | 5/2013 |
| WO | WO 01/89800 | A1 | 11/2001 |
| WO | WO 2004/089598 | A1 | 10/2004 |

OTHER PUBLICATIONS

Office Action of the corresponding JP Application No. 2022-148559 Mailed on Dec. 2, 2025.
Office Action of the corresponding JP Application No. 2022-148559 Mailed on Apr. 21, 2026.
Office Action of the corresponding CN Application No. 202311008328. 3, mailed on 2026-04-28.

761

762

763

CONTROL DEVICE OF INJECTION MOLDING MACHINE, INJECTION MOLDING MACHINE, AND METHOD OF CONTROLLING INJECTION MOLDING MACHINE

CROSS-REFERENCE TO RELATED APPLICATIONS

This application claims priority to Japanese Patent Application No. 2022-148559, filed on Sep. 16, 2022, which is incorporated by reference herein in its entirety.

BACKGROUND

Technical Field

Certain embodiments of the present invention relate to a control device of an injection molding machine, an injection molding machine, and a method of controlling an injection molding machine.

Description of Related Art

An injection molding machine described in the related art includes a screw that presses a molding material, an injection motor that moves the screw, and a control device that controls the injection motor. In a holding pressure process of controlling a pressure acting on the molding material from the screw, the control device limits an input to the injection motor according to a pressure setting pattern in order to reduce power consumption of the injection motor. The pressure setting pattern is set so that the pressure decreases from a first time to a second time. Although a specific configuration of the control device is not disclosed in the related art, a normal control device includes a large number of components such as a subtraction unit, an addition unit, and a compensation unit.

SUMMARY

According to an embodiment of the present invention, there is provided a control device of an injection molding machine including an injection member that presses a molding material and an injection drive source that moves the injection member. The control device includes an injection control unit that controls, in a holding pressure process of controlling a pressure acting on the molding material from the injection member, the injection drive source based on a set value of the pressure and on an actual value of the pressure. The injection control unit uses, instead of the set value of the pressure, a value subtracted over time from the set value of the pressure so that the actual value of the pressure gradually decreases with respect to the set value of the pressure, or uses, instead of the actual value of the pressure, a value added over time to the actual value of the pressure so that the actual value of the pressure gradually decreases with respect to the set value of the pressure.

DETAILED DESCRIPTION

Figure 1:
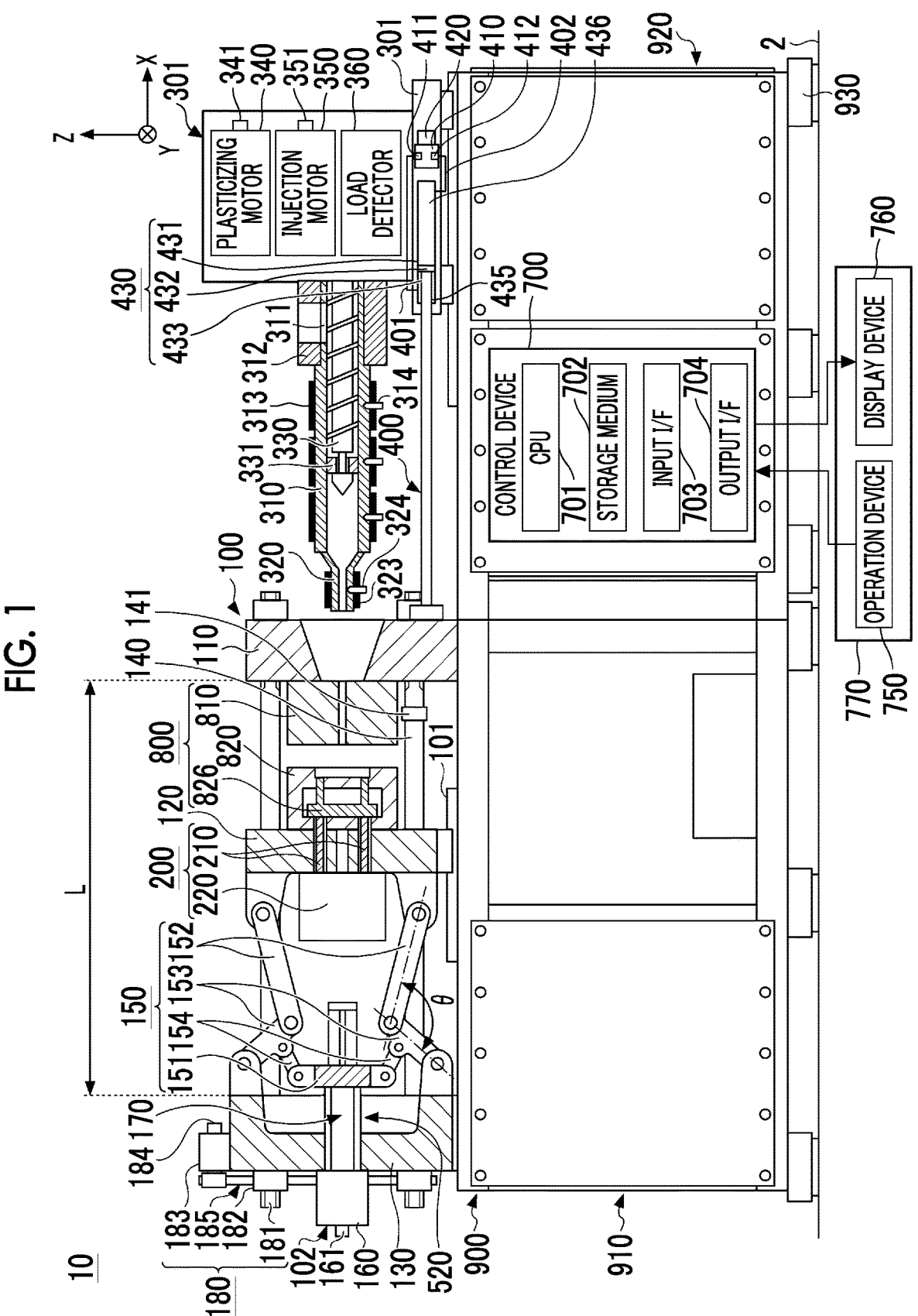
FIG. 1 is a view showing a state when mold opening is completed in an injection molding machine according to an embodiment.

In the related art, it is described that the input to the injection motor is limited according to the pressure setting pattern in order to reduce the power consumption of the injection motor in the holding pressure process. However, a specific configuration of the control device is not disclosed. A control device usually includes a large number of components such as a subtraction unit, an addition unit, and a compensation unit. Therefore, there is room for improvement in the configuration of the control device from the viewpoint of simplifying a control calculation.

It is desirable to provide a technique for reducing power consumption in a holding pressure process and simplifying a control calculation in the holding pressure process.

Hereinafter, embodiments of the present invention will be described with reference to the drawings. In each drawing, the same reference numerals will be assigned to the same or corresponding configurations, and description thereof will be omitted.

Injection Molding Machine

Figure 2:
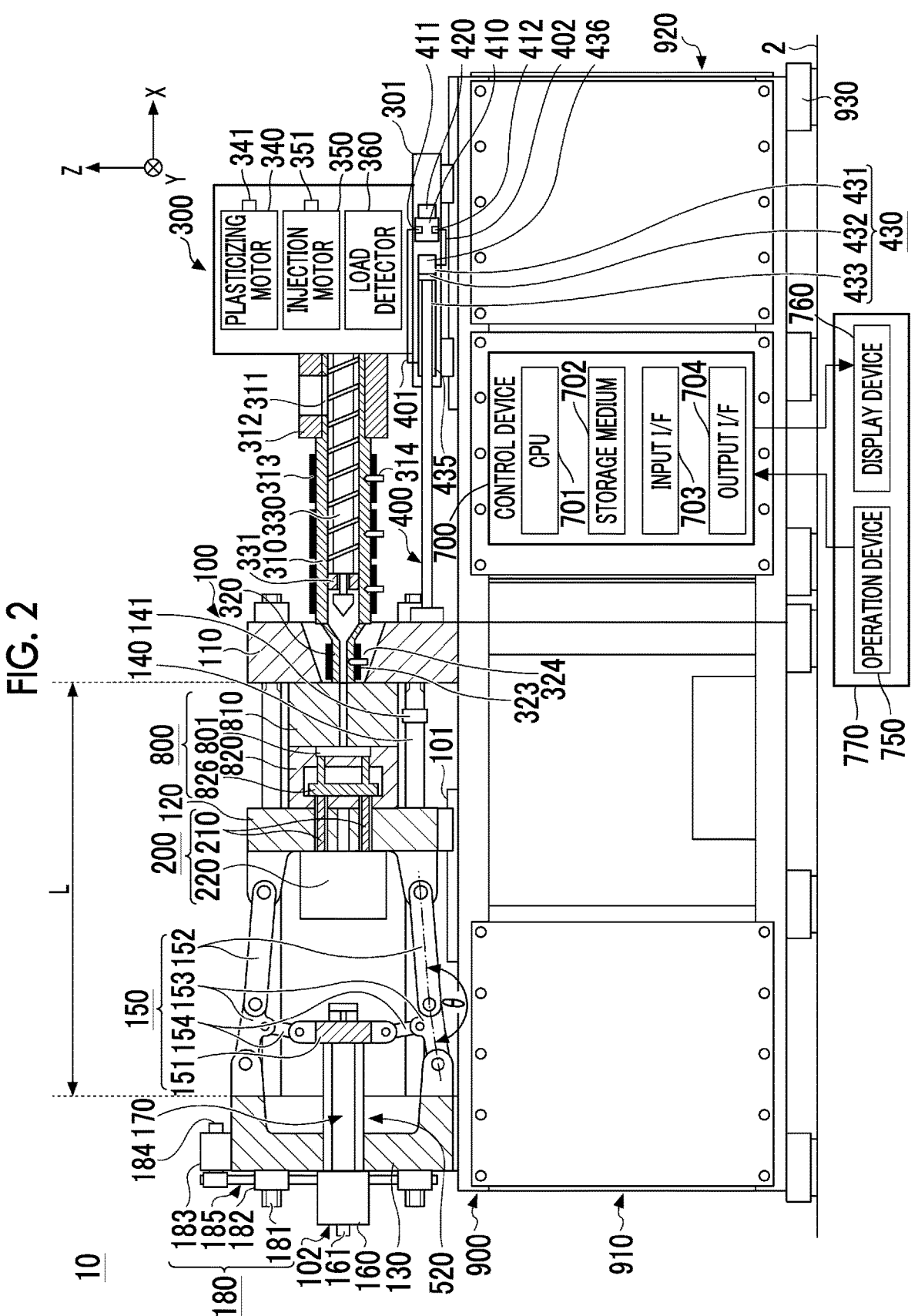
FIG. 2 is a view showing a state when mold clamping is performed in the injection molding machine according to the embodiment.

FIG. 1 is a view showing a state when mold opening is completed in an injection molding machine according to an embodiment. FIG. 2 is a view showing a state when mold clamping is performed in the injection molding machine according to the embodiment. In the present specification, an X-axis direction, a Y-axis direction, and a Z-axis direction are perpendicular to each other. The X-axis direction and the Y-axis direction represent a horizontal direction, and the Z-axis direction represents a vertical direction. In a case where a mold clamping unit 100 is of a horizontal type, the X-axis direction represents a mold opening and closing direction, and the Y-axis direction represents a width direction of an injection molding machine 10. A negative side in the Y-axis direction will be referred to as an operation side, and a positive side in the Y-axis direction will be referred to as a counter operation side.

As shown in FIGS. 1 and 2, the injection molding machine 10 includes the mold clamping unit 100 that opens and closes a mold unit 800, an ejector unit 200 that ejects a molding product molded by the mold unit 800, an injection unit 300 that injects a molding material into the mold unit 800, a moving unit 400 that causes the injection unit 300 to advance and retreat with respect to the mold unit 800, a control device 700 that controls each component of the injection molding machine 10, and a frame 900 that supports each component of the injection molding machine 10. The frame 900 includes a mold clamping unit frame 910 that supports the mold clamping unit 100, and an injection unit frame 920 that supports the injection unit 300. The mold clamping unit frame 910 and the injection unit frame 920 are respectively installed on a floor 2 via a leveling adjuster 930. The control device 700 is disposed in an internal space of the injection unit frame 920. Hereinafter, each component of the injection molding machine 10 will be described.

Mold Clamping Unit

In describing the mold clamping unit 100, a moving direction of a movable platen 120 during mold closing (for example, a positive direction of an X-axis) will be defined as forward, and a moving direction of the movable platen 120 during mold opening (for example, a negative direction of the X-axis) will be defined as rearward.

The mold clamping unit 100 performs mold closing, pressurizing, mold clamping, depressurizing, and mold opening of the mold unit 800. The mold unit 800 includes a stationary mold 810 and a movable mold 820.

For example, the mold clamping unit 100 is of a horizontal type, and the mold opening and closing direction is a horizontal direction. The mold clamping unit 100 includes a stationary platen 110 to which the stationary mold 810 is attached, the movable platen 120 to which the movable mold 820 is attached, and a moving mechanism 102 that moves the movable platen 120 in the mold opening and closing direction with respect to the stationary platen 110.

The stationary platen 110 is fixed to the mold clamping unit frame 910. The stationary mold 810 is attached to a surface of the stationary platen 110 facing the movable platen 120.

The movable platen 120 is disposed to be movable in the mold opening and closing direction with respect to the mold clamping unit frame 910. A guide 101 that guides the movable platen 120 is laid on the mold clamping unit frame 910. The movable mold 820 is attached to a surface of the movable platen 120 facing the stationary platen 110.

The moving mechanism 102 causes the movable platen 120 to advance and retreat with respect to the stationary platen 110 such that mold closing, pressurizing, mold clamping, depressurizing, and mold opening of the mold unit 800 are performed. The moving mechanism 102 includes a toggle support 130 disposed at an interval from the stationary platen 110, a tie bar 140 that connects the stationary platen 110 and the toggle support 130 to each other, a toggle mechanism 150 that moves the movable platen 120 in the mold opening and closing direction with respect to the toggle support 130, a mold clamping motor 160 that operates the toggle mechanism 150, a motion conversion mechanism 170 that converts a rotary motion into a linear motion of the mold clamping motor 160, and a mold space adjustment mechanism 180 that adjusts an interval between the stationary platen 110 and the toggle support 130.

The toggle support 130 is disposed at an interval from the stationary platen 110, and is placed on the mold clamping unit frame 910 to be movable in the mold opening and closing direction. The toggle support 130 may be disposed to be movable along a guide laid on the mold clamping unit frame 910. The guide of the toggle support 130 may be common to the guide 101 of the movable platen 120.

In the present embodiment, the stationary platen 110 is fixed to the mold clamping unit frame 910, and the toggle support 130 is disposed to be movable in the mold opening and closing direction with respect to the mold clamping unit frame 910. However, the toggle support 130 may be fixed to the mold clamping unit frame 910, and the stationary platen 110 may be disposed to be movable in the mold opening and closing direction with respect to the mold clamping unit frame 910.

The tie bar 140 connects the stationary platen 110 and the toggle support 130 to each other at an interval L in the mold opening and closing direction. A plurality of (for example, four) tie bars 140 may be used. The plurality of tie bars 140 are disposed parallel to each other in the mold opening and closing direction, and extend in accordance with a mold clamping force. At least one of the tie bars 140 may be provided with a tie bar strain detector 141 that measures a strain of the tie bar 140. The tie bar strain detector 141 transmits a signal indicating a measurement result thereof to the control device 700. The measurement result of the tie bar strain detector 141 is used in measuring the mold clamping force.

In the present embodiment, as a mold clamping force detector for measuring the mold clamping force, the tie bar strain detector 141 is used. However, the present invention is not limited thereto. The mold clamping force detector is not limited to a strain gauge type. The mold clamping force detector may be of a piezoelectric type, a capacitive type, a hydraulic type, an electromagnetic type, or the like, and an attachment position thereof is not limited to the tie bar 140.

The toggle mechanism 150 is disposed between the movable platen 120 and the toggle support 130, and moves the movable platen 120 in the mold opening and closing direction with respect to the toggle support 130. The toggle mechanism 150 has a crosshead 151 that moves in the mold opening and closing direction, and a pair of link groups bent and stretched by a movement of the crosshead 151. Each of the pair of link groups has a first link 152 and a second link 153 which are connected to be freely bent and stretched by a pin or the like. The first link 152 is oscillatingly attached to the movable platen 120 by a pin or the like. The second link 153 is oscillatingly attached to the toggle support 130 by a pin or the like. The second link 153 is attached to the crosshead 151 via a third link 154. When the crosshead 151 is caused to advance and retreat with respect to the toggle support 130, the first link 152 and the second link 153 are bent and stretched, and the movable platen 120 advances and retreats with respect to the toggle support 130.

A configuration of the toggle mechanism 150 is not limited to configurations shown in FIGS. 1 and 2. For example, in FIGS. 1 and 2, the number of nodes in each link group is five, but may be four. One end portion of the third link 154 may be connected to the node between the first link 152 and the second link 153.

The mold clamping motor 160 is attached to the toggle support 130, and operates the toggle mechanism 150. The mold clamping motor 160 causes the crosshead 151 to advance and retreat with respect to the toggle support 130 such that the first link 152 and the second link 153 are bent and stretched, and the movable platen 120 advances and retreats with respect to the toggle support 130. The mold clamping motor 160 is directly connected to the motion conversion mechanism 170, but may be connected to the motion conversion mechanism 170 via a belt, a pulley, or the like.

The motion conversion mechanism 170 converts a rotary motion of the mold clamping motor 160 into a linear motion of the crosshead 151. The motion conversion mechanism 170 includes a screw shaft and a screw nut screwed to the screw shaft. A ball or a roller may be interposed between the screw shaft and the screw nut.

The mold clamping unit 100 performs a mold closing process, a pressurizing process, a mold clamping process, a depressurizing process, a mold opening process, and the like under the control of the control device 700.

In the mold closing process, the mold clamping motor 160 is driven to cause the crosshead 151 to advance to a mold closing completion position at a set movement speed, thereby causing the movable platen 120 to advance such that the movable mold 820 touches the stationary mold 810. For example, a position or a movement speed of the crosshead 151 is measured by using a mold clamping motor encoder 161. The mold clamping motor encoder 161 measures rotation of the mold clamping motor 160, and transmits a signal indicating a measurement result thereof to the control device 700.

A crosshead position detector for measuring the position of the crosshead 151 and a crosshead movement speed detector for measuring the movement speed of the crosshead 151 are not limited to the mold clamping motor encoder 161, and a general detector can be used. In addition, a movable platen position detector for measuring a position of the movable platen 120 and a movable platen movement speed detector for measuring a movement speed of the movable platen 120 are not limited to the mold clamping motor encoder 161, and a general detector can be used.

In the pressurizing process, the mold clamping motor 160 is further driven to cause the crosshead 151 to further advance from the mold closing completion position to a mold clamping position, thereby generating a mold clamping force.

In the mold clamping process, the mold clamping motor 160 is driven to maintain the position of the crosshead 151 at the mold clamping position. In the mold clamping process, the mold clamping force generated in the pressurizing process is maintained. In the mold clamping process, a cavity space 801 (refer to FIG. 2) is formed between the movable mold 820 and the stationary mold 810, and the injection unit 300 fills the cavity space 801 with a liquid molding material. A molding product is obtained by solidifying the molding material filled therein.

The number of the cavity spaces 801 may be one or more. In the latter case, a plurality of the molding products can be obtained at the same time. An insert material may be disposed in a portion of the cavity space 801, and the other portion of the cavity space 801 may be filled with the molding material. A molding product in which the insert material and the molding material are integrated with each other can be obtained.

In the depressurizing process, the mold clamping motor 160 is driven to cause the crosshead 151 to retreat from the mold clamping position to a mold opening start position such that the movable platen 120 retreats to reduce the mold clamping force. The mold opening start position and the mold closing completion position may be the same position.

In the mold opening process, the mold clamping motor 160 is driven to cause the crosshead 151 to retreat from the mold opening start position to a mold opening completion position at a set movement speed such that the movable platen 120 retreats and the movable mold 820 is separated from the stationary mold 810. Thereafter, the ejector unit 200 ejects the molding product from the movable mold 820.

Setting conditions in the mold closing process, the pressurizing process, and the mold clamping process are collectively set as a series of setting conditions. For example, the movement speed or positions (including a mold closing start position, a movement speed switching position, the mold closing completion position, and the mold clamping position) of the crosshead 151 and the mold clamping force in the mold closing process and in the pressurizing process are collectively set as a series of setting conditions. The mold closing start position, the movement speed switching position, the mold closing completion position, and the mold clamping position are aligned in this order from a rear side toward a front side, and represent a start point and an end point of a section in which the movement speed is set. The movement speed is set for each section. The number of the movement speed switching positions may be one or more. The movement speed switching position may not be set. Only one of the mold clamping position and the mold clamping force may be set.

Setting conditions in the depressurizing process and in the mold opening process are set in the same manner. For example, the movement speed or positions (the mold opening start position, the movement speed switching position, and the mold opening completion position) of the crosshead 151 in the depressurizing process and in the mold opening process are collectively set as a series of setting conditions. The mold opening start position, the movement speed switching position, and the mold opening completion position are aligned in this order from the front side toward the rear side, and represent the start point and the end point of the section in which the movement speed is set. The movement speed is set for each section. The number of the movement speed switching positions may be one or more. The movement speed switching position may not be set. The mold opening start position and the mold closing completion position may be the same position. In addition, the mold opening completion position and the mold closing start position may be the same position.

Instead of the movement speed, positions, and the like of the crosshead 151, the movement speed, positions, and the like of the movable platen 120 may be set. In addition, instead of the position (for example, the mold clamping position) of the crosshead or the position of the movable platen, the mold clamping force may be set.

The toggle mechanism 150 amplifies a driving force of the mold clamping motor 160, and transmits the driving force to the movable platen 120. An amplification magnification is referred to as a toggle magnification. The toggle magnification is changed according to an angle θ (hereinafter, also referred to as a "link angle θ") formed between the first link 152 and the second link 153. The link angle θ is obtained from the position of the crosshead 151. When the link angle θ is 180°, the toggle magnification is maximized.

In a case where a mold space of the mold unit 800 is changed due to replacement of the mold unit 800, a temperature change in the mold unit 800, or the like, mold space adjustment is performed so that a predetermined mold clamping force is obtained during the mold clamping. For example, in the mold space adjustment, the interval L between the stationary platen 110 and the toggle support 130 is adjusted so that the link angle θ of the toggle mechanism 150 becomes a predetermined angle at a mold touch time at which the movable mold 820 touches the stationary mold 810.

The mold clamping unit 100 has the mold space adjustment mechanism 180. The mold space adjustment mechanism 180 performs the mold space adjustment by adjusting the interval L between the stationary platen 110 and the toggle support 130. For example, a time for the mold space adjustment is determined from an end point of a molding cycle to a start point of a subsequent molding cycle. For example, the mold space adjustment mechanism 180 has a screw shaft 181 formed in a rear end portion of the tie bar 140, a screw nut 182 held by the toggle support 130 to be rotatable and not to advance and retreat, and a mold space adjustment motor 183 that rotates the screw nut 182 screwed to the screw shaft 181.

The screw shaft 181 and the screw nut 182 are provided for each of the tie bars 140. A rotational driving force of the mold space adjustment motor 183 may be transmitted to a plurality of the screw nuts 182 via a rotational driving force transmitting unit 185. The plurality of screw nuts 182 can be rotated in synchronization with each other. The plurality of screw nuts 182 can be individually rotated by changing a transmission channel of the rotational driving force transmitting unit 185.

For example, the rotational driving force transmitting unit 185 is configured to include a gear. In this case, a driven gear is formed on an outer periphery of each screw nut 182, a driving gear is attached to an output shaft of the mold space adjustment motor 183, and a plurality of intermediate gears meshing with the driven gear and the driving gear are held to be rotatable in a central portion of the toggle support 130. The rotational driving force transmitting unit 185 may be configured to include a belt, a pulley, or the like instead of the gear.

An operation of the mold space adjustment mechanism 180 is controlled by the control device 700. The control device 700 drives the mold space adjustment motor 183 to rotate the screw nut 182. As a result, a position of the toggle support 130 with respect to the tie bar 140 is adjusted, and the interval L between the stationary platen 110 and the toggle support 130 is adjusted. In addition, a plurality of the mold space adjustment mechanisms may be used in combination.

The interval L is measured by using a mold space adjustment motor encoder 184. The mold space adjustment motor encoder 184 measures a rotation amount or a rotation direction of the mold space adjustment motor 183, and transmits a signal indicating a measurement result thereof to the control device 700. The measurement result of the mold space adjustment motor encoder 184 is used in monitoring or controlling the position or the interval L of the toggle support 130. A toggle support position detector for measuring the position of the toggle support 130 and an interval detector for measuring the interval L are not limited to the mold space adjustment motor encoder 184, and a general detector can be used.

The mold clamping unit 100 may include a mold temperature controller that adjusts a temperature of the mold unit 800. The mold unit 800 internally has a flow path of a temperature control medium. The mold temperature controller adjusts the temperature of the mold unit 800 by adjusting a temperature of the temperature control medium supplied to the flow path of the mold unit 800.

The mold clamping unit 100 of the present embodiment is of the horizontal type in which the mold opening and closing direction is the horizontal direction, but may be of a vertical type in which the mold opening and closing direction is an upward-downward direction.

The mold clamping unit 100 of the present embodiment has the mold clamping motor 160 as a drive unit. However, a hydraulic cylinder may be provided instead of the mold clamping motor 160. In addition, the mold clamping unit 100 may have a linear motor for mold opening and closing, and may have an electromagnet for mold clamping.

Ejector Unit

In describing the ejector unit 200, similarly to the description of the mold clamping unit 100, a moving direction of the movable platen 120 during the mold closing (for example, the positive direction of the X-axis) will be defined as forward, and a moving direction of the movable platen 120 during the mold opening (for example, the negative direction of the X-axis) will be defined as rearward.

The ejector unit 200 is attached to the movable platen 120, and advances and retreats together with the movable platen 120. The ejector unit 200 has an ejector rod 210 that ejects a molding product from the mold unit 800, and a drive mechanism 220 that moves the ejector rod 210 in the moving direction (X-axis direction) of the movable platen 120.

The ejector rod 210 is disposed to be able to advance and retreat in a through-hole of the movable platen 120. A front end portion of the ejector rod 210 comes into contact with an ejector plate 826 of the movable mold 820. The front end portion of the ejector rod 210 may be connected to or may not be connected to the ejector plate 826.

For example, the drive mechanism 220 has an ejector motor and a motion conversion mechanism that converts a rotary motion of the ejector motor into a linear motion of the ejector rod 210. The motion conversion mechanism includes a screw shaft and a screw nut screwed to the screw shaft. A ball or a roller may be interposed between the screw shaft and the screw nut.

The ejector unit 200 performs an ejection process under the control of the control device 700. In the ejection process, the ejector rod 210 is caused to advance from a standby position to an ejection position at a set movement speed such that the ejector plate 826 advances to eject the molding product. Thereafter, the ejector motor is driven to cause the ejector rod 210 to retreat at a set movement speed such that the ejector plate 826 retreats to an original standby position.

For example, a position or a movement speed of the ejector rod 210 is measured by using an ejector motor encoder. The ejector motor encoder measures the rotation of the ejector motor, and transmits a signal indicating a measurement result thereof to the control device 700. An ejector rod position detector for measuring the position of the ejector rod 210, and an ejector rod movement speed detector for measuring the movement speed of the ejector rod 210 are not limited to the ejector motor encoder, and a general detector can be used.

Injection Unit

In describing the injection unit 300, unlike the description of the mold clamping unit 100 or the description of the ejector unit 200, a moving direction of a screw 330 during filling (for example, the negative direction of the X-axis) will be defined as forward, and a moving direction of the screw 330 during plasticizing (for example, the positive direction of the X-axis) will be defined as rearward.

The injection unit 300 is installed on a slide base 301, and the slide base 301 is disposed to be able to advance and retreat with respect to the injection unit frame 920. The injection unit 300 is disposed to be able to advance and retreat with respect to the mold unit 800. The injection unit 300 touches the mold unit 800, and fills the cavity space 801 inside the mold unit 800 with the molding material. For example, the injection unit 300 has a cylinder 310 that heats the molding material, a nozzle 320 provided in a front end portion of the cylinder 310, the screw 330 disposed to be able to advance and retreat and to rotate inside the cylinder 310, a plasticizing motor 340 that rotates the screw 330, an injection motor 350 that causes the screw 330 to advance and retreat, and a load detector 360 that measures a load transmitted between the injection motor 350 and the screw 330.

The cylinder 310 heats the molding material supplied into the cylinder 310 from a feed port 311. For example, the molding material includes a resin. For example, the molding material is formed in a pellet shape, and is supplied to the feed port 311 in a solid state. The feed port 311 is formed in a rear portion of the cylinder 310. A cooler 312 such as a water-cooling cylinder is provided on an outer periphery of the rear portion of the cylinder 310. In front of the cooler 312, a first heating unit 313 such as a band heater and a first temperature measurer 314 are provided on an outer periphery of the cylinder 310.

The cylinder 310 is divided into a plurality of zones in an axial direction (for example, the X-axis direction) of the cylinder 310. The first heating unit 313 and the first temperature measurer 314 are provided in each of the plurality of zones. The control device 700 controls the first heating unit 313 so that a set temperature is set in each of the plurality of zones and a measurement temperature of the first temperature measurer 314 reaches the set temperature.

The nozzle 320 is provided in the front end portion of the cylinder 310, and is pressed against the mold unit 800. A second heating unit 323 and a second temperature measurer 324 are provided on an outer periphery of the nozzle 320. The control device 700 controls the second heating unit 323 so that a measurement temperature of the nozzle 320 reaches the set temperature.

The screw 330 is disposed to be able to rotate and to advance and retreat inside the cylinder 310. When the screw 330 is rotated, the molding material is fed forward along a helical groove of the screw 330. The molding material is gradually melted by heat from the cylinder 310 while being fed forward. As the liquid molding material is fed forward of the screw 330 and is accumulated in a front portion of the cylinder 310, the screw 330 retreats. Thereafter, when the screw 330 is caused to advance, the liquid molding material accumulated in front of the screw 330 is injected from the nozzle 320, and fills an inside of the mold unit 800.

As a backflow prevention valve for preventing a backflow of the molding material fed rearward from the front of the screw 330 when the screw 330 is pressed forward, a backflow prevention ring 331 is attached to a front portion of the screw 330 to be able to advance and retreat.

The backflow prevention ring 331 is pressed rearward by a pressure of the molding material in front of the screw 330 when the screw 330 is caused to advance, and retreats relative to the screw 330 to a close position (refer to FIG. 2) at which a flow path of the molding material is closed. Accordingly, the molding material accumulated in front of the screw 330 is prevented from flowing rearward.

On the other hand, the backflow prevention ring 331 is pressed forward by the pressure of the molding material fed forward along the helical groove of the screw 330 when the screw 330 is rotated, and advances relative to the screw 330 to an open position (refer to FIG. 1) at which the flow path of the molding material is open. Accordingly, the molding material is fed forward of the screw 330.

The backflow prevention ring 331 may be of either a co-rotation type rotating together with the screw 330 or a non-co-rotation type that does not rotate together with the screw 330.

The injection unit 300 may have a drive source that causes the backflow prevention ring 331 to advance and retreat with respect to the screw 330 between the open position and the close position.

The plasticizing motor 340 rotates the screw 330. A drive source that rotates the screw 330 is not limited to the plasticizing motor 340, and may be a hydraulic pump, for example.

The injection motor 350 causes the screw 330 to advance and retreat. A motion conversion mechanism that converts a rotary motion of the injection motor 350 into a linear motion of the screw 330 or the like is provided between the injection motor 350 and the screw 330. For example, the motion conversion mechanism has a screw shaft and a screw nut screwed to the screw shaft. A ball or a roller may be provided between the screw shaft and the screw nut. A drive source that causes the screw 330 to advance and retreat is not limited to the injection motor 350, and may be a hydraulic cylinder, for example.

The load detector 360 measures a load transmitted between the injection motor 350 and the screw 330. The measured load is converted into a pressure by the control device 700. The load detector 360 is provided in a load transmission channel between the injection motor 350 and the screw 330, and measures the load acting on the load detector 360.

The load detector 360 transmits a signal of the measured load to the control device 700. The load measured by the load detector 360 is converted into the pressure acting between the screw 330 and the molding material, and is used in controlling or monitoring the pressure received from the molding material by the screw 330, a back pressure against the screw 330, the pressure acting on the molding material from the screw 330, or the like.

A pressure detector for measuring the pressure of the molding material is not limited to the load detector 360, and a general detector can be used. For example, a nozzle pressure sensor or a mold internal pressure sensor may be used. The nozzle pressure sensor is installed in the nozzle 320. The mold internal pressure sensor is installed inside the mold unit 800.

The injection unit 300 performs a plasticizing process, a filling process, a holding pressure process, and the like under the control of the control device 700. The filling process and the holding pressure process may be collectively referred to as an injection process.

In the plasticizing process, the plasticizing motor 340 is driven to rotate the screw 330 at a set rotational speed such that the molding material is fed forward along the helical groove of the screw 330. As a result, the molding material is gradually melted. As the liquid molding material is fed forward of the screw 330 and is accumulated in a front portion of the cylinder 310, the screw 330 retreats. For example, the rotational speed of the screw 330 is measured by using a plasticizing motor encoder 341. The plasticizing motor encoder 341 measures the rotation of the plasticizing motor 340, and transmits a signal indicating a measurement result thereof to the control device 700. A screw rotational speed detector for measuring the rotational speed of the screw 330 is not limited to the plasticizing motor encoder 341, and a general detector can be used.

In the plasticizing process, the injection motor 350 may be driven to apply a set back pressure to the screw 330 in order to limit a sudden retreat of the screw 330. The back pressure applied to the screw 330 is measured by using the load detector 360, for example. When the screw 330 retreats to a plasticizing completion position and a predetermined amount of the molding material is accumulated in front of the screw 330, the plasticizing process is completed.

The position and the rotational speed of the screw 330 in the plasticizing process are collectively set as a series of setting conditions. For example, a plasticizing start position, a rotational speed switching position, and the plasticizing completion position are set. These positions are aligned in this order from the front side toward the rear side, and represent a start point and an end point of a section in which the rotational speed is set. The rotational speed is set for each section. The number of the rotational speed switching positions may be one or more. The rotational speed switching position may not be set. In addition, the back pressure is set for each section.

In the filling process, the injection motor 350 is driven to cause the screw 330 to advance at a set movement speed, and the cavity space 801 inside the mold unit 800 is filled with the liquid molding material accumulated in front of the screw 330. The position or the movement speed of the screw 330 is measured by using an injection motor encoder 351, for example. The injection motor encoder 351 measures the rotation of the injection motor 350, and transmits a signal indicating a measurement result thereof to the control device 700. When the position of the screw 330 reaches a set position, the filling process is switched to the holding pressure process (so-called V/P switching). The position where the V/P switching is performed will be referred to as a V/P switching position. The set movement speed of the screw 330 may be changed in accordance with the position, a time, or the like of the screw 330.

The position and the movement speed of the screw 330 in the filling process are collectively set as a series of setting conditions. For example, a filling start position (also referred to as an "injection start position"), the movement speed switching position, and the V/P switching position are set. These positions are aligned in this order from the rear side toward the front side, and represent the start point and the end point of the section in which the movement speed is set. The movement speed is set for each section. The number of the movement speed switching positions may be one or more. The movement speed switching position may not be set.

An upper limit of the pressure of the screw 330 is set for each section in which the movement speed of the screw 330 is set. The pressure of the screw 330 is measured by the load detector 360. In a case where the pressure of the screw 330 is equal to or lower than a setting pressure, the screw 330 advances at a set movement speed. On the other hand, in a case where the pressure of the screw 330 exceeds the setting pressure, in order to protect the mold, the screw 330 is caused to advance at a movement speed slower than the set movement speed so that the pressure of the screw 330 is equal to or lower than the setting pressure.

After the position of the screw 330 reaches the V/P switching position in the filling process, the screw 330 may be temporarily stopped at the V/P switching position, and thereafter, the V/P switching may be performed. Immediately before the V/P switching, instead of the screw 330 being stopped, the screw 330 may be caused to advance at a low speed, or may be caused to retreat at a low speed. In addition, a screw position detector for measuring the position of the screw 330 and a screw movement speed detector for measuring the movement speed of the screw 330 are not limited to the injection motor encoder 351, and a general detector can be used.

In the holding pressure process, the injection motor 350 is driven to press the screw 330 forward. A pressure (hereinafter, also referred to as a "holding pressure") of the molding material in a front end portion of the screw 330 is held at a set pressure, and the molding material remaining inside the cylinder 310 is pressed toward the mold unit 800. An insufficient amount of the molding material due to cooling shrinkage inside the mold unit 800 can be replenished. The holding pressure is measured by using the load detector 360, for example. A set value of the holding pressure may be changed depending on an elapsed time from the start of the holding pressure process or the like. A plurality of holding pressures and a plurality of holding times for holding the holding pressures in the holding pressure process may be respectively set, or may be collectively set as a series of setting conditions.

In the holding pressure process, the molding material in the cavity space 801 inside the mold unit 800 is gradually cooled, and when the holding pressure process is completed, an inlet of the cavity space 801 is closed by the solidified molding material. This state is referred to as gate seal, and prevents the backflow of the molding material from the cavity space 801. After the holding pressure process, a cooling process starts. In the cooling process, the molding material inside the cavity space 801 is solidified. In order to shorten a molding cycle time, the plasticizing process may be performed during the cooling process.

The injection unit 300 of the present embodiment is of an in-line screw type, but may be of a pre-plasticizing type. The pre-plasticizing type injection unit supplies the molding material melted inside a plasticizing cylinder to an injection cylinder, and the molding material is injected into the mold unit from the injection cylinder. Inside the plasticizing cylinder, the screw is disposed to be rotatable and not to advance and retreat, or the screw is disposed to be rotatable and to be able to advance and retreat. Meanwhile, a plunger is disposed to be able to advance and retreat inside the injection cylinder.

In addition, the injection unit 300 of the present embodiment is of a horizontal type in which the axial direction of the cylinder 310 is a horizontal direction, but may be of a vertical type in which the axial direction of the cylinder 310 is an upward-downward direction. The mold clamping unit combined with a vertical type injection unit 300 may be of the vertical type or the horizontal type. Similarly, the mold clamping unit combined with a horizontal type injection unit 300 may be of the horizontal type or the vertical type.

Moving Unit

In describing the moving unit 400, similarly to the description of the injection unit 300, a moving direction of the screw 330 during the filling (for example, the negative direction of the X-axis) will be defined as forward, and a moving direction of the screw 330 during the plasticizing (for example, the positive direction of the X-axis) will be defined as rearward.

The moving unit 400 causes the injection unit 300 to advance and retreat with respect to the mold unit 800. The moving unit 400 presses the nozzle 320 against the mold unit 800, thereby generating a nozzle touch pressure. The moving unit 400 includes a hydraulic pump 410, a motor 420 serving as a drive source, a hydraulic cylinder 430 serving as a hydraulic actuator, and the like.

The hydraulic pump 410 has a first port 411 and a second port 412. The hydraulic pump 410 is a pump that can rotate in both directions, and switches rotation directions of the motor 420 such that a hydraulic fluid (for example, oil) is suctioned from any one of the first port 411 and the second port 412 and is discharged from the other to generate a hydraulic pressure. The hydraulic pump 410 can suction the hydraulic fluid from a tank, and can discharge the hydraulic fluid from any one of the first port 411 and the second port 412.

The motor 420 operates the hydraulic pump 410. The motor 420 drives the hydraulic pump 410 in a rotation direction and with a rotation torque in accordance with a control signal transmitted from the control device 700. The motor 420 may be an electric motor, or may be an electric servo motor.

The hydraulic cylinder 430 has a cylinder body 431, a piston 432, and a piston rod 433. The cylinder body 431 is fixed to the injection unit 300. The piston 432 partitions an inside of the cylinder body 431 into a front chamber 435 serving as a first chamber and into a rear chamber 436 serving as a second chamber. The piston rod 433 is fixed to the stationary platen 110.

The front chamber 435 of the hydraulic cylinder 430 is connected to the first port 411 of the hydraulic pump 410 via a first flow path 401. The hydraulic fluid discharged from the first port 411 is supplied to the front chamber 435 via the first flow path 401, whereby the injection unit 300 is pressed forward. The injection unit 300 advances, and the nozzle 320 is pressed against the stationary mold 810. The front chamber 435 functions as a pressure chamber that generates the nozzle touch pressure of the nozzle 320 by means of the pressure of the hydraulic fluid supplied from the hydraulic pump 410.

On the other hand, the rear chamber 436 of the hydraulic cylinder 430 is connected to the second port 412 of the hydraulic pump 410 via a second flow path 402. The hydraulic fluid discharged from the second port 412 is supplied to the rear chamber 436 of the hydraulic cylinder 430 via the second flow path 402, whereby the injection unit 300 is pressed rearward. The injection unit 300 retreats, and the nozzle 320 is separated from the stationary mold 810.

In the present embodiment, the moving unit 400 includes the hydraulic cylinder 430, but the present invention is not limited thereto. For example, instead of the hydraulic cylinder 430, an electric motor and a motion conversion mechanism that converts a rotary motion of the electric motor into a linear motion of the injection unit 300 may be used.

Control Device

For example, the control device 700 is configured to include a computer, and has a central processing unit (CPU) 701, a storage medium 702 such as a memory, an input interface 703, and an output interface 704 as shown in FIGS. 1 and 2. The control device 700 performs various types of control by causing the CPU 701 to execute a program stored in the storage medium 702. In addition, the control device 700 receives a signal from the outside through the input interface 703, and transmits the signal to the outside through the output interface 704.

The control device 700 repeatedly performs the plasticizing process, the mold closing process, the pressurizing process, the mold clamping process, the filling process, the holding pressure process, the cooling process, the depressurizing process, the mold opening process, the ejection process, and the like, thereby repeatedly manufacturing the molding product. A series of operations for obtaining the molding product, for example, an operation from the start of the plasticizing process to the start of the subsequent plasticizing process, will be referred to as a "shot" or a "molding cycle". In addition, a time required for one shot will be referred to as a "molding cycle time" or a "cycle time".

For example, one molding cycle has the plasticizing process, the mold closing process, the pressurizing process, the mold clamping process, the filling process, the holding pressure process, the cooling process, the depressurizing process, the mold opening process, and the ejection process in this order. The order described here is the order of the start times of the respective processes. The filling process, the holding pressure process, and the cooling process are performed during the mold clamping process. The start of the mold clamping process may coincide with the start of the filling process. The completion of the depressurizing process coincides with the start of the mold opening process.

A plurality of processes may be performed at the same time in order to shorten the molding cycle time. For example, the plasticizing process may be performed during the cooling process of the previous molding cycle or may be performed during the mold clamping process. In this case, the mold closing process may be performed in an initial stage of the molding cycle. In addition, the filling process may start during the mold closing process. In addition, the ejection process may start during the mold opening process. In a case where an on-off valve for opening and closing a flow path of the nozzle 320 is provided, the mold opening process may start during the plasticizing process. The reason is as follows. Even in a case where the mold opening process starts during the plasticizing process, when the on-off valve closes the flow path of the nozzle 320, the molding material does not leak from the nozzle 320.

One molding cycle may include a process other than the plasticizing process, the mold closing process, the pressurizing process, the mold clamping process, the filling process, the holding pressure process, the cooling process, the depressurizing process, the mold opening process, and the ejection process.

For example, after the holding pressure process is completed and before the plasticizing process starts, a pre-plasticizing suck-back process of causing the screw 330 to retreat to a preset plasticizing start position may be performed. The pressure of the molding material accumulated in front of the screw 330 before the plasticizing process starts can be reduced, and a sudden retreat of the screw 330 when the plasticizing process starts can be prevented.

In addition, after the plasticizing process is completed and before the filling process starts, a post-plasticizing suck-back process may be performed in which the screw 330 is caused to retreat to a preset filling start position (also referred to as an "injection start position"). The pressure of the molding material accumulated in front of the screw 330 before the filling process starts can be reduced, and a leakage of the molding material from the nozzle 320 before the filling process starts can be prevented.

The control device 700 is connected to an operation device 750 that receives an input operation of a user, and to a display device 760 that displays a screen. For example, the operation device 750 and the display device 760 may be integrated with each other in a form of a touch panel 770. The touch panel 770 serving as the display device 760 displays the screen under the control of the control device 700. For example, the screen of the touch panel 770 may display settings of the injection molding machine 10, and information on a current state of the injection molding machine 10. In addition, for example, the screen of the touch panel 770 may display a button for accepting the input operation of the user or an operation portion such as an input field. The touch panel 770 serving as the operation device 750 detects an input operation of the user on the screen, and outputs a signal corresponding to the input operation to the control device 700. In this manner, for example, while checking information displayed on the screen, the user can perform setting (including an input of a set value) of the injection molding machine 10 by operating the operation portion provided on the screen. In addition, the user can operate the injection molding machine 10 corresponding to the operation portion by operating the operation portion provided on the screen. For example, the operation of the injection molding machine 10 may be an operation (including stopping) of the mold clamping unit 100, the ejector unit 200, the injection unit 300, the moving unit 400, or the like. In addition, the operation of the injection molding machine 10 may be switching between the screens displayed on the touch panel 770 serving as the display device 760.

A case has been described in which the operation device 750 and the display device 760 of the present embodiment are integrated with each other as the touch panel 770. However, both of these may be independently provided. In addition, a plurality of the operation devices 750 may be provided. The operation device 750 and the display device 760 are disposed on the operation side (a negative direction of the Y-axis) of the mold clamping unit 100 (more specifically, the stationary platen 110).

Details of Control Device

Figure 3:
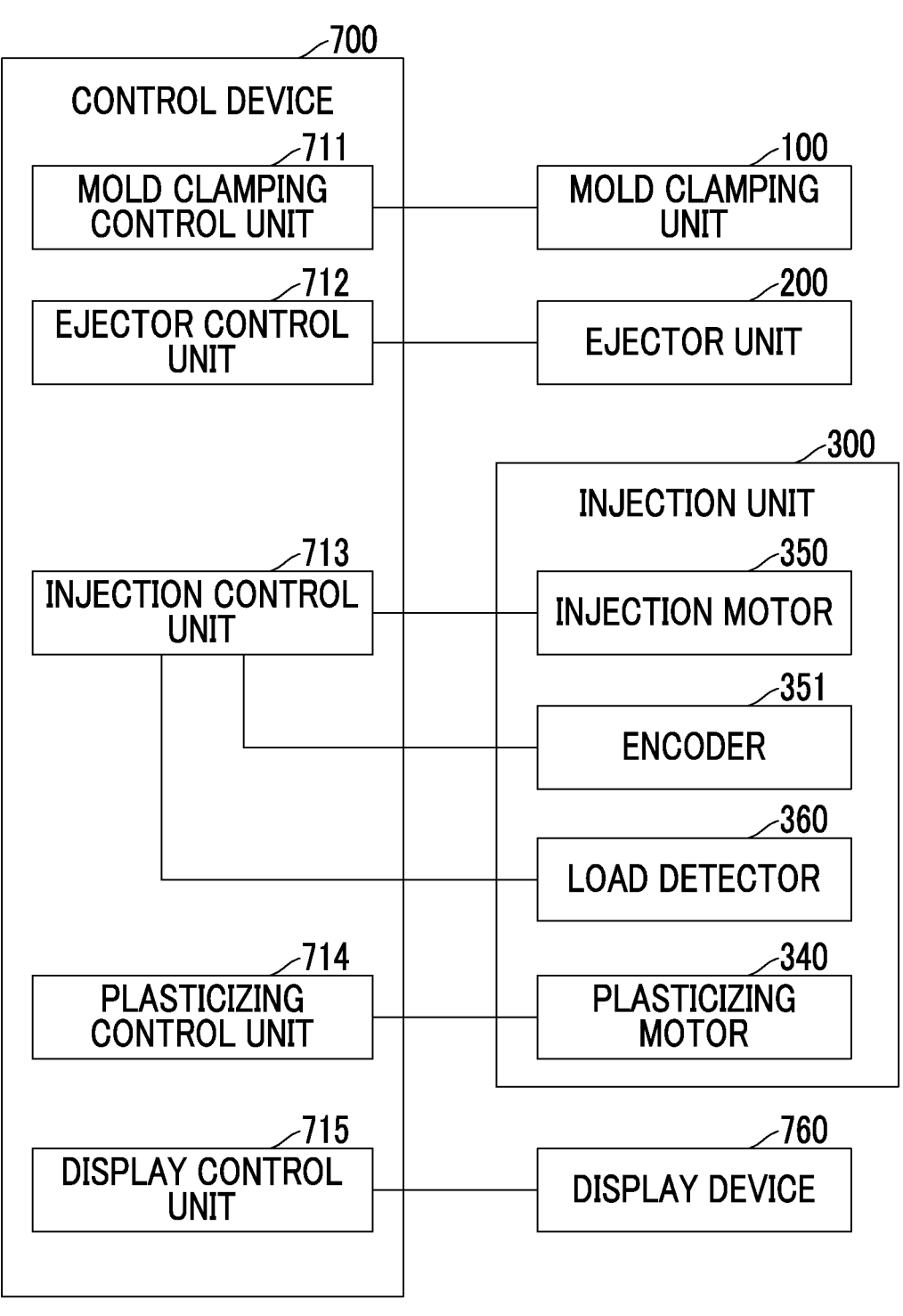
FIG. 3 is a functional block diagram showing an example of components of a control device.

Next, an example of components of the control device 700 will be described with reference to FIG. 3. Each functional block shown in FIG. 3 is conceptual, and may not necessarily be configured to be physical as shown. All or a portion of each functional block can be configured to be functionally or physically distributed and integrated in any desired unit. All or any desired portion of each processing function performed in each functional block may be realized by a program executed by a CPU, or may be realized as hardware using a wired logic.

Figure 4:
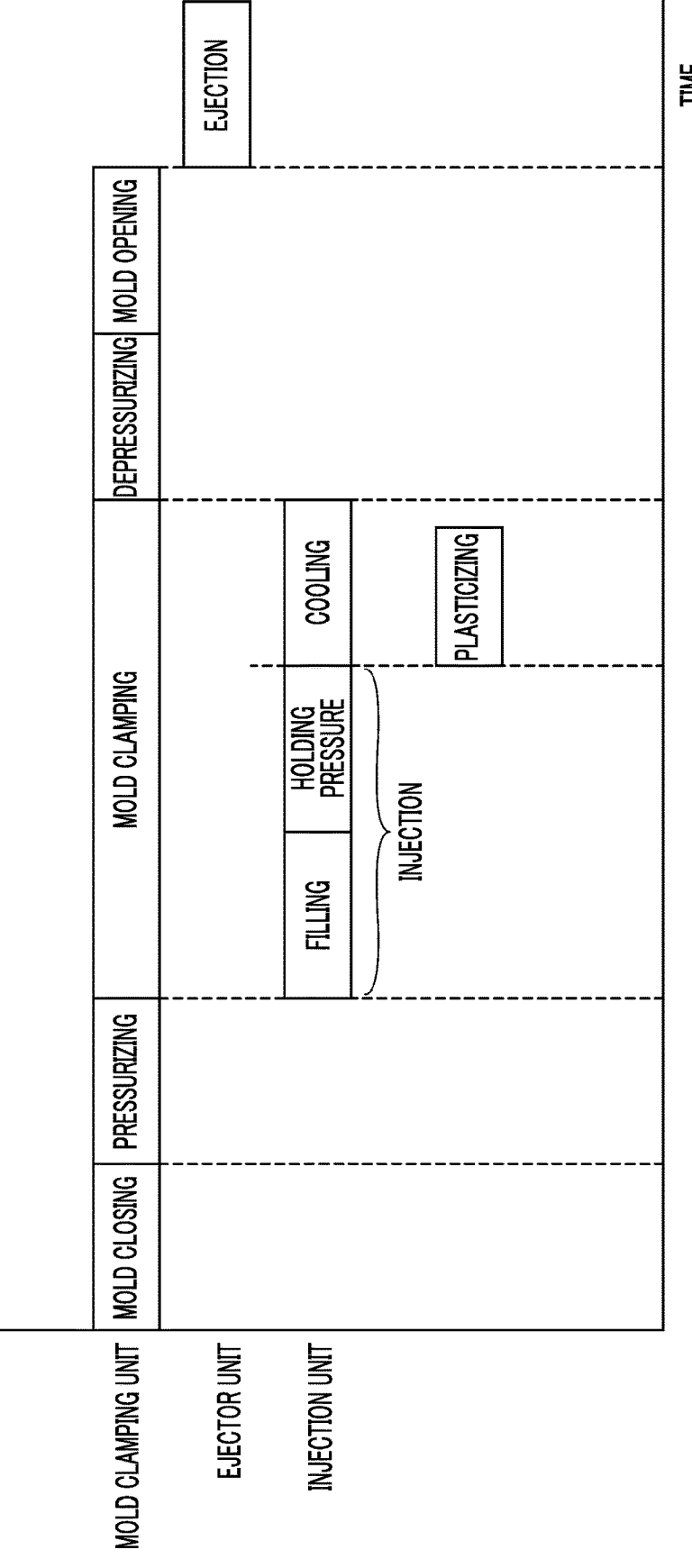
FIG. 4 is a diagram showing an example of processes of a molding cycle.

As shown in FIG. 3, for example, the control device 700 includes a mold clamping control unit 711, an ejector control unit 712, an injection control unit 713, a plasticizing control unit 714, and a display control unit 715. The mold clamping control unit 711 controls the mold clamping unit 100 to perform the mold closing process, the pressurizing process, the mold clamping process, the depressurizing process, and the mold opening process shown in FIG. 4. The ejector control unit 712 controls the ejector unit 200 to perform the ejection process. The injection control unit 713 controls an injection drive source of the injection unit 300 to perform the injection process. The injection drive source is, for example, the injection motor 350, but may be a hydraulic cylinder or the like. The injection process includes the filling process and the holding pressure process. The injection process is performed during the mold clamping process. The plasticizing control unit 714 controls a plasticizing drive source of the injection unit 300 to perform the plasticizing process. The plasticizing drive source is, for example, the plasticizing motor 340, but may be a hydraulic pump or the like. The plasticizing process is performed during the cooling process. The display control unit 715 controls the display device 760.

The filling process is a process of controlling the injection drive source so that an actual value of a movement speed of an injection member provided inside the cylinder 310 becomes a set value. The filling process is a process of filling the inside of the mold unit 800 with the liquid molding material (for example, a resin) accumulated in front of the injection member by moving the injection member forward. The injection member is, for example, the screw 330, but may be a plunger.

The movement speed of the injection member is measured by using a speed detector. The speed detector is, for example, the injection motor encoder 351. In the filling process, the pressure acting on the molding material from the injection member increases as the injection member moves forward. The filling process may include a process of temporarily stopping the injection member or a process of causing the injection member to retreat immediately before the holding pressure process.

The holding pressure process is a process of controlling the injection drive source so that an actual value of the pressure acting on the molding material from the injection member becomes a set value. The holding pressure process is a process of replenishing a shortage of the molding material due to cooling shrinkage in the mold unit 800 by pressing the injection member forward. The pressure is measured by using a pressure detector such as the load detector 360. As the pressure detector, a nozzle pressure sensor or a mold internal pressure sensor may be used.

Figure 5:
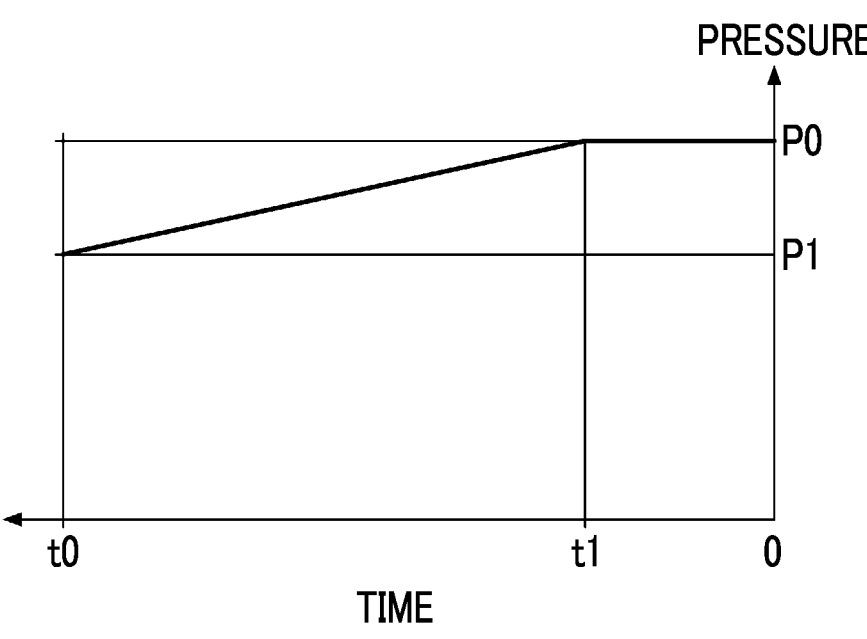
FIG. 5 is a diagram showing an example of a change in dimension of a molding material in a holding pressure process over time and a change in a pressure acting on the molding material from an injection member in the holding pressure process over time.
Figure 5:
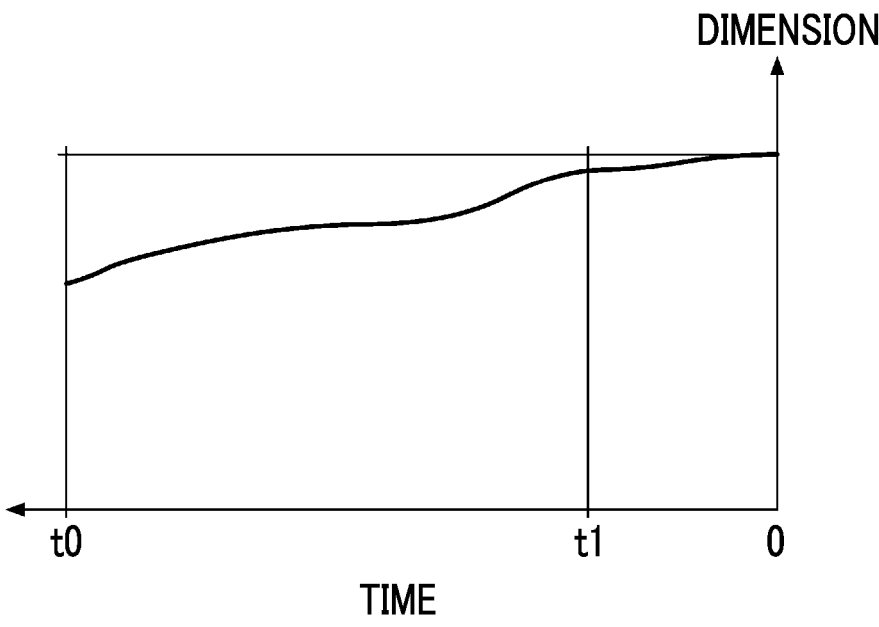

Next, with reference to FIG. 5, an example of a change in dimension of the molding material (for example, a resin) in the holding pressure process over time and a change in the pressure acting on the molding material (hereinafter, also simply referred to as "pressure") from the injection member in the holding pressure process over time will be described. As shown in FIG. 5, in the holding pressure process, cooling and solidification of the resin progresses, and the resin shrinks (the dimension of the resin decreases). A shrinkage rate thereof is represented by (L0–L1)/L0. Here, L0 is a dimension before shrinkage, and L1 is a dimension after shrinkage.

As the cooling and solidification of the resin progresses, a pressure required to prevent the backflow of the resin gradually decreases. Therefore, generating a constant pressure from the start to the end of the holding pressure process causes an excessive pressure to be generated from the middle of the holding pressure process, which is a waste of power. As shown in FIG. 5, the power consumption can be reduced by decreasing the pressure over time from the middle of the holding pressure process.

Figure 6:
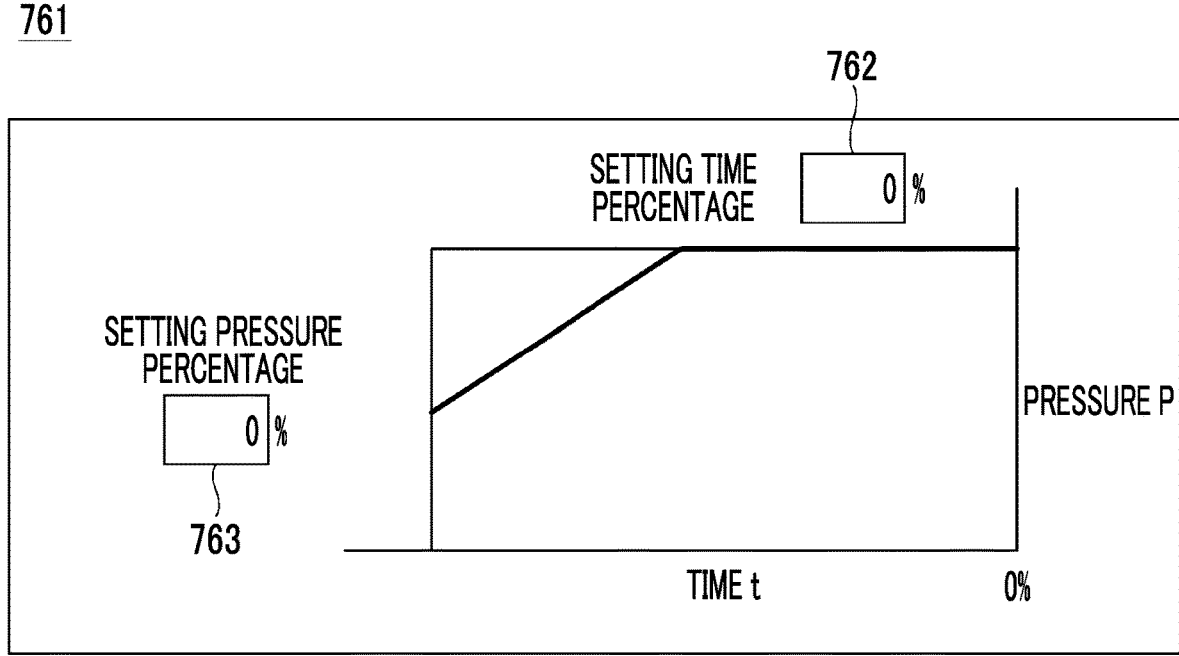
FIG. 6 is a view showing an example of a pressure setting screen in the holding pressure process.

Here, it is conceivable to divide the holding pressure process into n (n is an integer greater than or equal to 2) processes and set a pressure for each process. However, too many divisions (n) are required to smoothly reduce the pressure, which results in complicated settings. Therefore, the injection control unit 713 smoothly lowers the pressure by using settings input to a setting screen 761 shown in FIG. 6.

For example, the setting screen 761 is used to continuously reduce an actual value of the pressure from the middle of the holding pressure process to the end of the holding pressure process. In a case where the holding pressure process is divided into n (n is an integer greater than or equal to 2) processes, the setting screen 761 may be used to continuously reduce the pressure from the middle of a k-th (k is an integer greater than or equal to 1 and less than or equal to n) process to the end of the k-th process.

The setting screen 761 is displayed on the display device 760 by the display control unit 715. For example, the setting screen 761 has a first input field 762 and a second input field 763. The first input field 762 is a field for inputting a start time t1 of the decrease in pressure shown in FIG. 5. The second input field 763 is a field for inputting a pressure P1 at an end time t0 of the decrease in pressure shown in FIG. 5.

A worker inputs numerical values in the first input field 762 and the second input field 763 while viewing the setting screen 761. For example, the start time t1 is input as a percentage (%) with respect to the end time t0. The start time t1 and the end time t0 are input with the start of the holding pressure process (or the start of the k-th process) as a reference (zero). For example, the pressure P1 at the end time t0 is input as a percentage (%) with respect to a pressure P0 at the start time t1.

As described above, the setting screen 761 may be used to continuously reduce the pressure from the middle of the k-th (k is an integer greater than or equal to 1 and less than or equal to n) process to the end of the k-th process. In a case where k is an integer of (n−1), the pressure P1 at the end time t0 of the k-th process may be automatically set based on a set value of the pressure in the (k+1)-th process, and, for example, may be automatically set to be equal to the set value of the pressure in the (k+1)-th process. In addition, the input in the second input field 763 may be limited so that the pressure P1 at the end time t0 of the k-th process does not fall below the set value of the pressure in the (k+1)-th process.

Next, before describing injection control units 713A to 713D according to first to fourth examples with reference to FIGS. 7 to 10, an injection control unit 713E according to a reference example will be described with reference to FIG. 11. While the injection control units 713A to 713D according to the first to fourth examples perform the holding pressure process using the settings input on the setting screen 761, the injection control unit 713E according to the reference example performs the holding pressure process without using the settings input on the setting screen 761.

Figure 11:
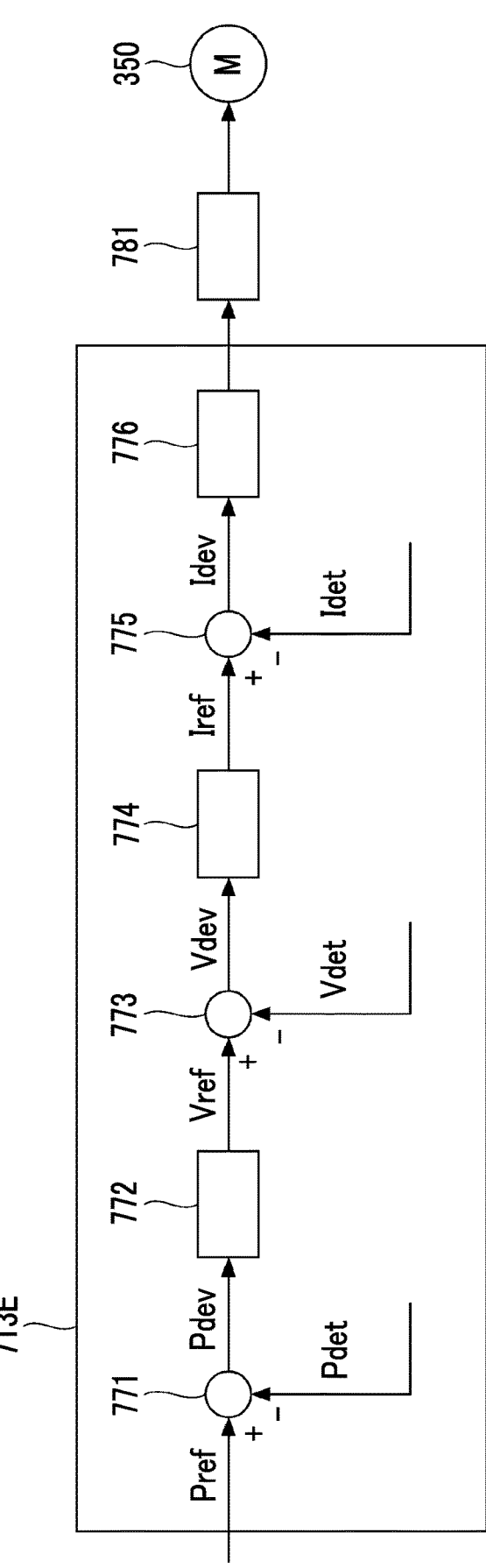
FIG. 11 is a diagram showing an injection control unit according to a reference example.

As shown in FIG. 11, for example, the injection control unit 713E includes a first calculation unit 771, a speed command creation unit 772, a third calculation unit 773, a current command creation unit 774, a second calculation unit 775, and a voltage command creation unit 776.

The first calculation unit 771 calculates a difference Pdev (Pdev=Pref−Pdet) between a pressure set value Pref of the resin and a pressure actual value Pdet. The pressure actual value Pdet is acquired by the pressure detector. As described above, as the pressure detector, for example, the load detector 360, the nozzle pressure sensor, or the mold internal pressure sensor is used.

The first calculation unit 771 may calculate a deviation between the pressure set value Pref and the pressure actual value Pdet, and may calculate, for example, a ratio between the pressure set value Pref and the pressure actual value Pdet.

The speed command creation unit 772 creates a speed command value Vref of the screw 330 so that the difference Pdev calculated by the first calculation unit 771 becomes small (preferably zero). For example, a proportional-integral (PI) calculation or a proportional-integral-derivative (PID) calculation is used to create the speed command value Vref.

The third calculation unit 773 calculates a difference Vdev (Vdev=Vref−Vdet) between the speed command value Vref and a speed actual value Vdet. The speed actual value Vdet is acquired by the speed detector. As the speed detector, for example, the injection motor encoder 351 is used as described above.

The third calculation unit 773 may calculate a deviation between the speed command value Vref and the speed actual value Vdet, and may calculate, for example, a ratio between the speed command value Vref and the speed actual value Vdet.

The current command creation unit 774 creates a current command value Iref of the injection motor 350 so that the difference Vdev calculated by the third calculation unit 773 becomes small (preferably zero). For example, a PI calculation or a PID calculation is used to create the current command value Iref.

The second calculation unit 775 calculates a difference Idev (Idev=Iref−Idet) between the current command value Iref and a current actual value Idet. The current actual value Idet is acquired by a current detector. The current detector is attached to, for example, an inverter 781 or the injection motor 350.

The second calculation unit 775 may calculate a deviation between the current command value Iref and the current actual value Idet, and may calculate, for example, a ratio between the current command value Iref and the current actual value Idet.

The voltage command creation unit 776 creates a voltage command value so that the difference Idev calculated by the second calculation unit 775 becomes small (preferably zero). The inverter 781 supplies an alternating current to the injection motor 350 according to the voltage command value created by the voltage command creation unit 776.

The injection control unit 713E may not include some of the components shown in FIG. 11. For example, the speed command creation unit 772 and the third calculation unit 773 are not provided, and the current command creation unit 774 may create the current command value Iref of the injection motor 350 so that the difference Pdev calculated by the first calculation unit 771 becomes small (preferably zero).

In addition, the injection control unit 713E may include components not shown in FIG. 11. For example, the injection control unit 713E may include a torque command creation unit (not shown) instead of the current command creation unit 774. This is because a torque of the injection motor 350 is substantially proportional to the current of the injection motor 350.

The torque command creation unit creates a torque command value Tref of the injection motor 350 so that the difference Vdev calculated by the third calculation unit 773 becomes small (preferably zero). The second calculation unit 775 calculates a difference Tdev (Tdev=Tref−Tdet) between the torque command value Tref and a torque actual value Tdet. The voltage command creation unit 776 creates a voltage command value so that the difference Tdev calculated by the second calculation unit 775 becomes small (preferably zero).

As shown in FIG. 11, the injection control unit 713E includes a large number of components. In order to continuously reduce the pressure from the middle of the holding pressure process to the end of the holding pressure process (or from the middle of the k-th process to the end of the k-th process), it is necessary to further increase the number of components. There is room for improvement in positions and functions of the components for continuously reducing the pressure from the viewpoint of simplifying a control calculation of the injection control unit 713.

Figure 7:
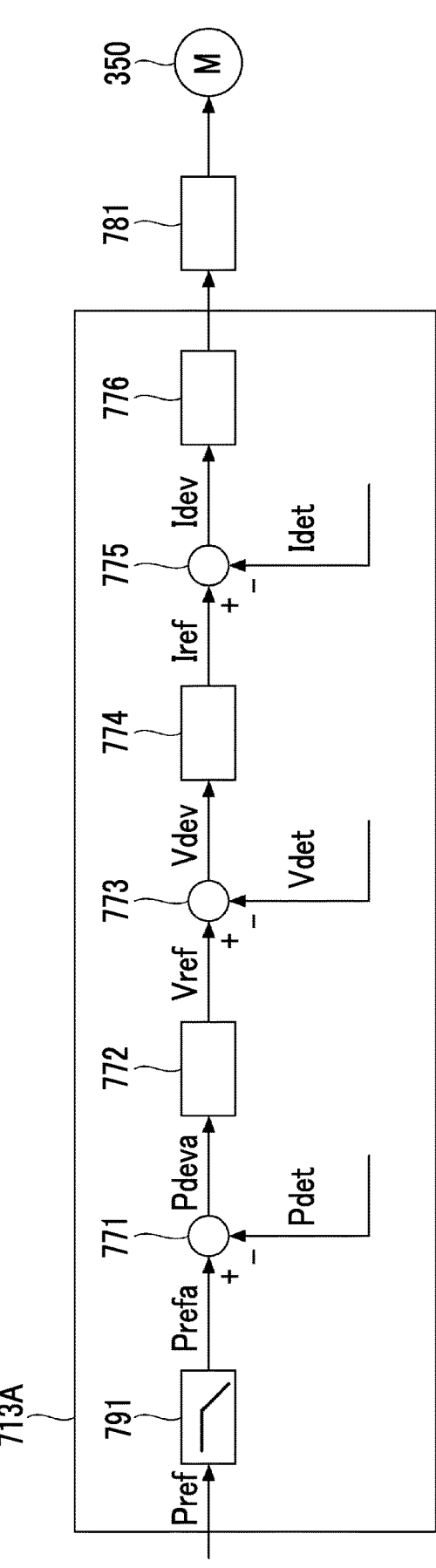
FIG. 7 is a diagram showing an injection control unit according to a first example.

Next, the injection control unit 713A according to the first example will be described with reference to FIG. 7. Hereinafter, differences from the injection control unit 713E according to the reference example will be mainly described. The injection control unit 713A uses, instead of the pressure set value Pref, a value Prefa subtracted over time from the pressure set value Pref so that the pressure actual value Pdet of the resin gradually decreases with respect to the pressure set value Pref of the resin.

For example, the injection control unit 713A includes a first command limiting unit 791. The first command limiting unit 791 inputs, instead of the pressure set value Pref (Pref=P0), the value Prefa subtracted over time from the pressure set value Pref to the first calculation unit 771 according to the settings input on the setting screen 761.

A subtraction amount (Pref−Prefa) to be subtracted by the first command limiting unit 791 increases over time, and, for example, increases at a constant ratio Kp (Kp>0). For example, Equations (1) and (2) are established as follows.

$$Pref-Prefa=Kp\times(t-t1) \tag{1}$$

$$Kp=(P0-P1)/(t0-t1) \tag{2}$$

In Equation (1), t is greater than or equal to t1 and less than or equal to t0 (t1≤t≤t0). In a case where t is greater than or equal to 0 and less than or equal to t1 (0≤t≤t1), Prefa is equal to Pref.

As described above, the first command limiting unit 791 inputs the value Prefa subtracted over time from the pressure set value Pref to the first calculation unit 771. The first calculation unit 771 calculates a difference Pdeva (Pdeva=Prefa−Pdet) between the subtracted value Prefa and the pressure actual value Pdet. The speed command creation unit 772 creates a speed command value Vref of the screw 330 so that the difference Pdeva calculated by the first calculation unit 771 becomes small (preferably zero).

According to the present example, the first command limiting unit 791 inputs, instead of the pressure set value Pref (Pref=P0), the value Prefa (Prefa=P0−Kp×(t−t1)) subtracted over time from the pressure set value Pref to the first calculation unit 771. The pressure set value Pref can be gradually quasi-reduced, and the pressure actual value Pdet can be gradually reduced with respect to the pressure set value Pref. Therefore, the power consumption of the injection motor 350 can be reduced.

In addition, according to the present example, since the value input to the first calculation unit 771 is corrected, the control calculation of the injection control unit 713 can be simplified compared to correcting the value (that is, the difference Pdev) output from the first calculation unit 771. The PI calculation, the PID calculation, or the like is performed in a process of creating the command value (for example, the speed command value Vref) so that the difference Pdev becomes small. However, it is complicated to provide a correction term in these calculations.

Figure 8:
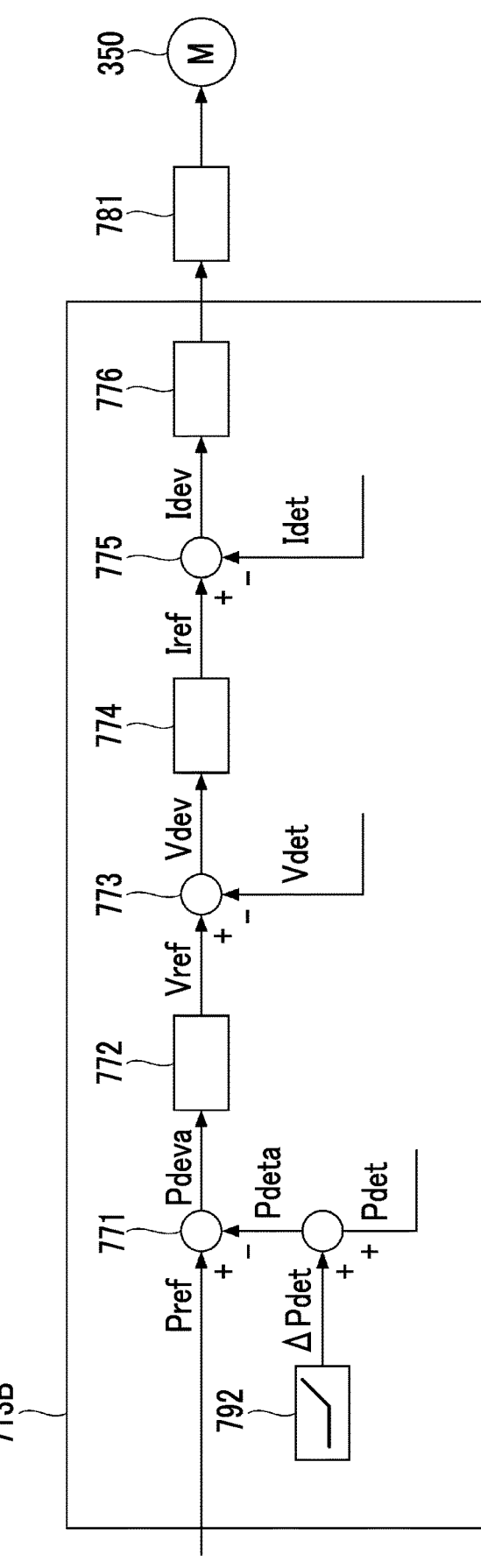
FIG. 8 is a diagram showing an injection control unit according to a second example.

Next, the injection control unit 713B according to the second example will be described with reference to FIG. 8. Hereinafter, differences from the injection control unit 713E according to the reference example will be mainly described. The injection control unit 713B uses, instead of the pressure actual value Pdet, a value Pdeta added over time to the pressure actual value Pdet so that the pressure actual value Pdet gradually decreases with respect to the pressure set value Pref.

For example, the injection control unit 713B includes a first numerical value addition unit 792. The first numerical value addition unit 792 adds a numerical value ΔPdet to the pressure actual value Pdet input to the first calculation unit 771 according to the settings input on the setting screen 761. The numerical value ΔPdet to be added increases over time, and increases, for example, at a constant ratio Kp (Kp>0). For example, Equation (3) is established as follows.

$$\Delta Pdet = Kp(t-t1) \tag{3}$$

In Equation (3), t is greater than or equal to t1 and less than or equal to t0 (t1≤t≤t0). In a case where t is greater than or equal to 0 and less than or equal to t1 (0≤t≤t1), ΔPdet is zero.

As is clear from Equations (3) and (1), the addition amount ΔPdet of the present example is equal to the subtraction amount (Pref−Prefa) of the first example. Therefore, the difference calculated by the first calculation unit 771 in the present example and in the first example is the same Pdeva. Therefore, according to the present example, as in the first example, the pressure actual value Pdet gradually decreases with respect to the pressure set value Pref. Therefore, the power consumption of the injection motor 350 can be reduced. In addition, according to the present example, since the value input to the first calculation unit 771 is corrected as in the first example, the control calculation can be simplified compared to correcting the value (that is, the difference Pdev) output from the first calculation unit 771.

Figure 9:
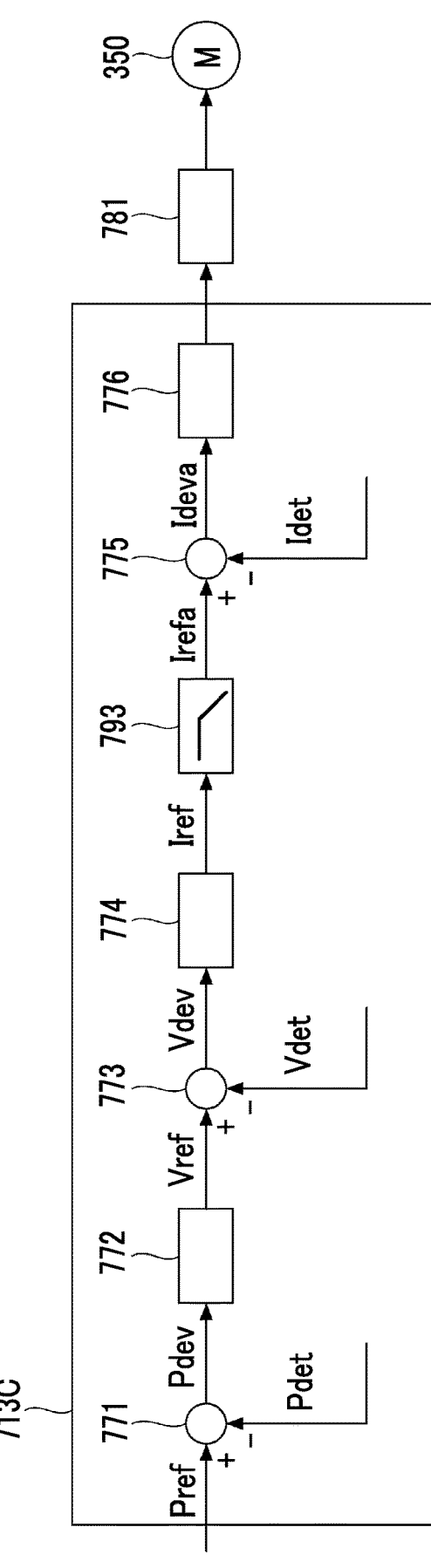
FIG. 9 is a diagram showing an injection control unit according to a third example.

Next, the injection control unit 713C according to the third example will be described with reference to FIG. 9. Hereinafter, differences from the injection control unit 713E according to the reference example will be mainly described. The injection control unit 713C uses, instead of the current command value Iref, a value Irefa subtracted over time from the current command value Iref so that the pressure actual value Pdet gradually decreases with respect to the pressure set value Pref.

For example, the injection control unit 713C includes a second command limiting unit 793. The second command limiting unit 793 inputs, instead of the current command value Iref, the value Irefa subtracted over time from the current command value Iref to the second calculation unit 775 according to the settings input on the setting screen 761.

A subtraction amount (Iref−Irefa) to be subtracted by the second command limiting unit 793 increases over time, and, for example, increases at a constant ratio Ki (Ki>0). For example, Equations (4) and (5) are established as follows.

$$Iref-Irefa = Ki(t-t1) \tag{4}$$

$$Ki = a \times Kp \tag{5}$$

In Equation (4), t is greater than or equal to t1 and less than or equal to t0 (t1≤t≤t0). In a case where t is greater than or equal to 0 and less than or equal to t1 (0≤t≤t1), Irefa is equal to Iref. In Equation (5), a is a constant. As the current of the injection motor 350 increases, the torque of the injection motor 350 increases and the pressure of the resin increases. The pressure of the resin is substantially proportional to the current of the injection motor 350. A ratio of the current to the pressure (current/pressure) is substantially constant. A representative value of the ratio is a.

As described above, the second command limiting unit 793 inputs the value Irefa subtracted over time from the current command value Iref to the second calculation unit 775. The second calculation unit 775 calculates a difference Ideva (Ideva=Irefa−Idet) between the subtracted value Irefa and the current actual value Idet. The voltage command creation unit 776 creates a voltage command value so that the difference Ideva calculated by the second calculation unit 775 becomes small (preferably zero).

According to the present example, unlike the first example, the value Irefa subtracted over time from the current command value Iref is input to the second calculation unit 775. Here, the current and the pressure are substantially proportional to each other. Therefore, according to the present example, as in the first example, the pressure actual value Pdet gradually decreases with respect to the pressure set value Pref. Therefore, the power consumption of the injection motor 350 can be reduced.

In addition, according to the present example, since the value input to the second calculation unit 775 is corrected, the control calculation can be simplified compared to correcting the value (that is, the difference Idev) output from the second calculation unit 775. A calculation or the like is performed in a process of creating the voltage command value so that the difference Idev becomes small. However, it is complicated to provide a correction term in this calculation.

As in the injection control unit 713E, the injection control unit 713C may have a torque command creation unit (not shown) instead of the current command creation unit 774. In this case, the second command limiting unit 793 inputs, instead of the torque command value Tref, a value Trefa subtracted over time from the torque command value Tref to the second calculation unit 775 according to the settings input on the setting screen 761.

A subtraction amount (Tref–Trefa) to be subtracted by the second command limiting unit 793 increases over time, and, for example, increases at a constant ratio Kt (Kt>0). For example, Equations (6) and (7) are established as follows.

$$\text{Tref–Trefa}=Kt(t-t1) \tag{6}$$

$$Kt=b{\times}Kp \tag{7}$$

In Equation (6), t is greater than or equal to t1 and less than or equal to t0 (t1≤t≤t0). In a case where t is greater than or equal to 0 and less than or equal to t1 (0≤t≤t1), Trefa is equal to Tref. In Equation (7), b is a constant. As the torque of the injection motor 350 increases, the pressure of the resin increases. The pressure of the resin is substantially proportional to the torque of the injection motor 350. A ratio of the torque to the pressure (torque/pressure) is substantially constant. A representative value of the ratio is b.

As described above, the second command limiting unit 793 inputs the value Trefa subtracted over time from the torque command value Tref to the second calculation unit 775. The second calculation unit 775 calculates a difference Tdeva (Tdeva=Trefa–Tdet) between the subtracted value Trefa and the torque actual value Tdet. The voltage command creation unit 776 creates the voltage command value so that the difference Tdeva calculated by the second calculation unit 775 becomes small (preferably zero).

The torque and the pressure are substantially proportional to each other. Therefore, even in a case where the value Trefa subtracted over time from the torque command value Tref is input to the second calculation unit 775, the pressure actual value Pdet gradually decreases with respect to the pressure set value Pref, as in the first example. Therefore, the power consumption of the injection motor 350 can be reduced. In addition, since the value input to the second calculation unit 775 is corrected, the control calculation can be simplified compared to correcting the value (that is, the difference Tdev) output from the second calculation unit 775.

Figure 10:
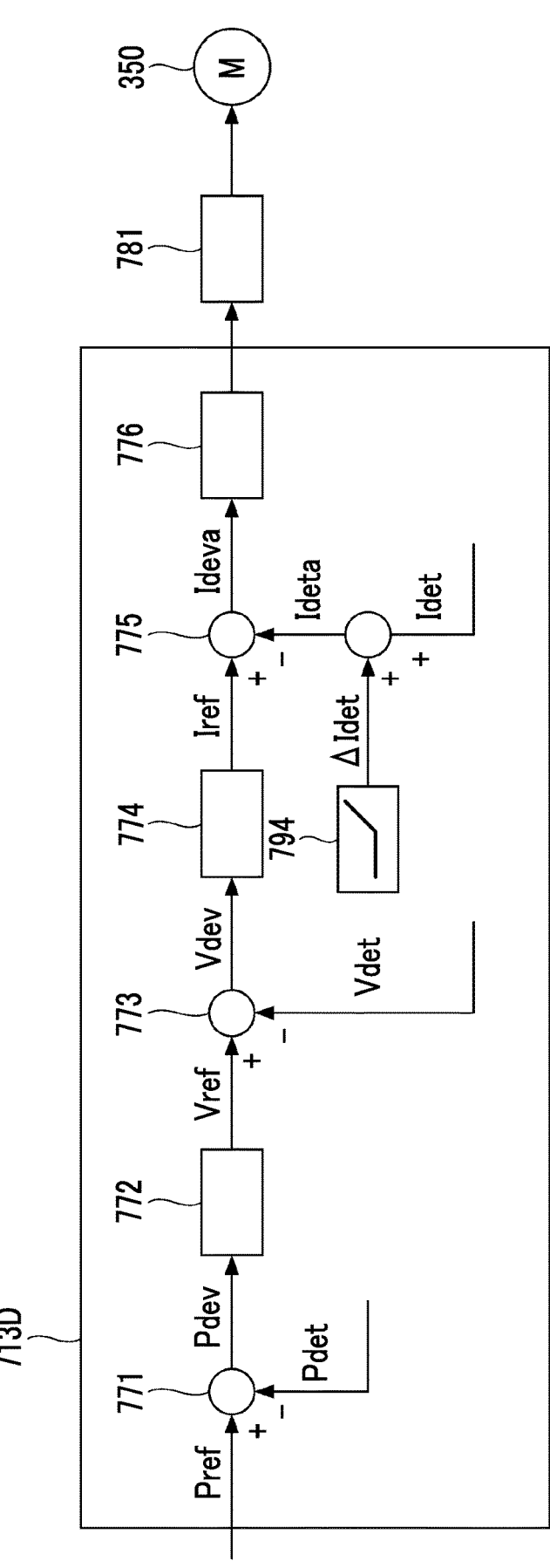
FIG. 10 is a diagram showing an injection control unit according to a fourth example.

Next, the injection control unit 713D according to the fourth example will be described with reference to FIG. 10. Hereinafter, differences from the injection control unit 713E according to the reference example will be mainly described. The injection control unit 713D uses, instead of the current actual value Idet, a value Ideta added over time to the current actual value Idet so that the pressure actual value Pdet gradually decreases with respect to the pressure set value Pref.

For example, the injection control unit 713D includes a second numerical value addition unit 794. The second numerical value addition unit 794 adds a numerical value ΔIdet to the current actual value Idet input to the second calculation unit 775 according to the settings input on the setting screen 761. The numerical value ΔIdet to be added increases over time, and, for example, increases at a constant ratio Ki (Ki>0). For example, Equation (8) is established as follows.

$$\Delta\text{Idet}=Ki(t-t1) \tag{8}$$

In Equation (8), t is greater than or equal to t1 and less than or equal to t0 (t1≤t≤t0). In a case where t is greater than or equal to 0 and less than or equal to t1 (0≤t≤t1), ΔIdet is zero.

As is clear from Equations (8) and (4), the addition amount ΔIdet of the present example is equal to the subtraction amount (Iref–Irefa) of the third example. Therefore, the difference calculated by the second calculation unit 775 in the present example and in the third example is the same Ideva. Therefore, according to the present example, as in the third example, the pressure actual value Pdet gradually decreases with respect to the pressure set value Pref. Therefore, the power consumption of the injection motor 350 can be reduced. In addition, according to the present example, since the value input to the second calculation unit 775 is corrected as in the third example, the control calculation can be simplified compared to correcting the value (that is, the difference Idev) output from the second calculation unit 775.

As in the injection control unit 713E, the injection control unit 713D may have a torque command creation unit (not shown) instead of the current command creation unit 774. In this case, the second numerical value addition unit 794 adds a numerical value ΔTdet to the torque actual value Tdet input to the second calculation unit 775 according to the settings input on the setting screen 761. The numerical value ΔTdet to be added increases over time, and, for example, increases at a constant ratio Kt (Kt>0). For example, Equation (9) is established as follows.

$$\Delta\text{Tdet}=Kt(t-t1) \tag{9}$$

In Equation (9), t is greater than or equal to t1 and less than or equal to t0 (t1≤t≤t0). In a case where t is greater than or equal to 0 and less than or equal to t1 (0≤t≤t1), ΔTdet is zero.

As is clear from Equations (9) and (6), the addition amount ΔTdet of the present example is equal to the subtraction amount (Tref–Trefa) of the third example. Therefore, even in a case where the numerical value ΔTdet is added to the torque actual value Tdet input to the second calculation unit 775, the pressure actual value Pdet gradually decreases with respect to the pressure set value Pref, as in the third example. Therefore, the power consumption of the injection motor 350 can be reduced. In addition, since the value input to the second calculation unit 775 is corrected, the control calculation can be simplified compared to correcting the value (that is, the difference Tdev) output from the second calculation unit 775.

Meanwhile, the pressure is substantially proportional to the current or the torque, but is not completely proportional to the current or the torque. Therefore, the injection control unit 713A (see FIG. 7) of the first example is preferable to the injection control unit 713C (see FIG. 9) of the third example in order to continuously reduce the pressure of the resin with high accuracy. Similarly, the injection control unit 713B (see FIG. 8) of the second example is preferable to the injection control unit 713D (see FIG. 10) of the fourth example.

In addition, it is difficult to intuitively understand the addition of the numerical value ΔPdet to the pressure actual value Pdet for the purpose of gradually reducing the pressure actual value Pdet because operation directions of the numerical values are opposite to each other between the purpose and the method. Therefore, the injection control unit 713A (see FIG. 7) of the first example is preferable to the injection control unit 713B (see FIG. 8) of the second example. Similarly, the injection control unit 713C (see FIG. 9) of the third example is preferable to the injection control unit 713D (see FIG. 10) of the fourth example.

Hitherto, the embodiments of the control device of an injection molding machine, the injection molding machine, and the method of controlling an injection molding machine according to the present invention have been described. However, the present invention is not limited to the above-described embodiments. Various modifications, corrections, substitutions, additions, deletions, and combinations can be made within the scope of the appended claims. As a matter of course, all of these also belong to the technical scope of the present invention.

It should be understood that the invention is not limited to the above-described embodiment, but may be modified into various forms on the basis of the spirit of the invention. Additionally, the modifications are included in the scope of the invention.

What is claimed is:

1. A control device of an injection molding machine including an injection member that presses a molding material and an injection drive source that moves the injection member, the control device comprising:

an injection control unit that controls, in a holding pressure process of controlling a pressure acting on the molding material from the injection member, the injection drive source based on a set value of the pressure and on an actual value of the pressure, wherein the holding pressure process includes a first process and a second process subsequent to the first process, and in the first process, the injection control unit replaces, for a control calculation, a set value of a pressure in the first process with a modified value obtained by subtracting a correction amount that increases over time from zero during the first process from the set value of the pressure in the first process so that an actual value of a pressure in the first process gradually decreases toward a set value of a pressure in the second process, or, replaces, for a control calculation, the actual value of the pressure in the first process with a modified value obtained by adding a correction amount that increases over time from zero during the first process to the actual value of the pressure in the first process so that the actual value of the pressure in the first process gradually decreases toward the set value of the pressure in the second process.

2. A control device of an injection molding machine including an injection member that presses a molding material and an injection drive source that moves the injection member, the control device comprising:

an injection control unit that controls, in a holding pressure process of controlling a pressure acting on the molding material from the injection member, the injection drive source based on a current command value or a torque command value of the injection drive source and on a current actual value or a torque actual value of the injection drive source, wherein the holding pressure process includes a first process and a second process subsequent to the first process, and in the first process, the injection control unit replaces, for a control calculation, a current command value or a torque command value in the first process with a modified value obtained by subtracting a correction amount that increases over time from zero during the first process from the current command value in the first process or from the torque command value in the first process so that an actual value of a pressure in the first process gradually decreases toward a set value of a pressure in the second process, or replaces, for a control calculation, a current actual value or a torque actual value in the first process with a modified value obtained by adding a correction amount that increases over time from zero during the first process to the current actual value in the first process or to the torque actual value in the first process so that the actual value of the pressure in the first process gradually decreases toward the set value of the pressure in the second process.

3. The control device of an injection molding machine according to claim 1, further comprising:

a display control unit that displays a setting screen used for setting a decrease in the actual value of the pressure in the first process toward the set value of the pressure in the second process on a display device.

4. An injection molding machine comprising:

the control device according to claim 1;

the injection member; and the injection drive source.

5. An injection molding machine comprising:

the control device according to claim 2;

the injection member; and the injection drive source.

6. A method of controlling an injection molding machine including an injection member that presses a molding material and an injection drive source that moves the injection member, the method comprising:

an injection control process of controlling, in a holding pressure process of controlling a pressure acting on the molding material from the injection member, the injection drive source based on a set value of the pressure and on an actual value of the pressure, wherein the holding pressure process includes a first process and a second process subsequent to the first process, and in the first process, the injection control process includes a process of replacing, for a control calculation, a set value of a pressure in the first process with a modified value obtained by subtracting a correction amount that increases over time from zero during the first process from the set value of the pressure in the first process so that an actual value of a pressure in the first process gradually decreases toward a set value of a pressure in the second process, or a process of replacing, for a control calculation, the actual value of the pressure in the first process with a modified value obtained by adding a correction amount that increases over time from zero during the first process to the actual value of the pressure in the first process so that the actual value of the pressure in the first process gradually decreases toward the set value of the pressure in the second process.

7. A method of controlling an injection molding machine including an injection member that presses a molding material and an injection drive source that moves the injection member, the method comprising:

an injection control process of controlling, in a holding pressure process of controlling a pressure acting on the molding material from the injection member, the injection drive source based on a current command value or a torque command value of the injection drive source and on a current actual value or a torque actual value of the injection drive source, wherein the holding pressure process includes a first process and a second process subsequent to the first process, and in the first process, the injection control process includes a process of replacing, for a control calculation, a current command value or a torque command value in the first process with a modified value obtained by subtracting a correction amount that increases over time from zero during the first process from the current command value in the first process or from the torque command value in the first process so that an actual value of a pressure in the first process gradually decreases toward a set value of a pressure in the second process, or a process of using replacing, for a control calculation, the current actual value or a torque actual value in the first process with a modified value obtained by adding a correction amount that increases over time from zero during the first process to the current actual value in the first process or to the torque actual value in the first process so that the actual value of the pressure in the first process gradually decreases toward the set value of the pressure in the second process.

8. The method of controlling an injection molding machine according to claim 6, further comprising:

a display control process of displaying a setting screen used for setting a decrease in the actual value of the pressure in the first process toward the set value of the pressure in the second process on a display device.

* * * * *